M. G. McLANE.
FIBER CLEANING DEVICE.
APPLICATION FILED SEPT. 23, 1909.
978,389.
Patented Dec. 13, 1910.
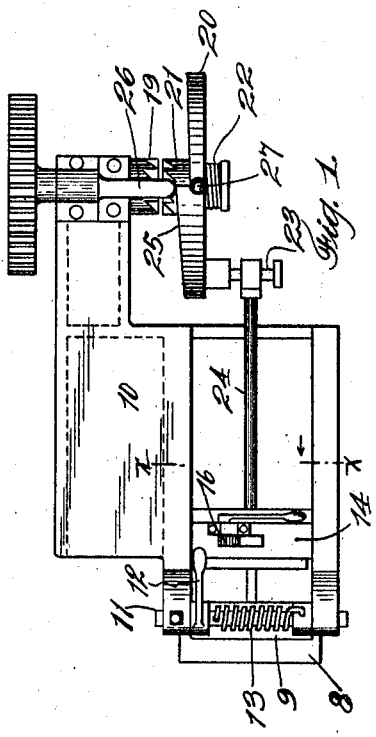
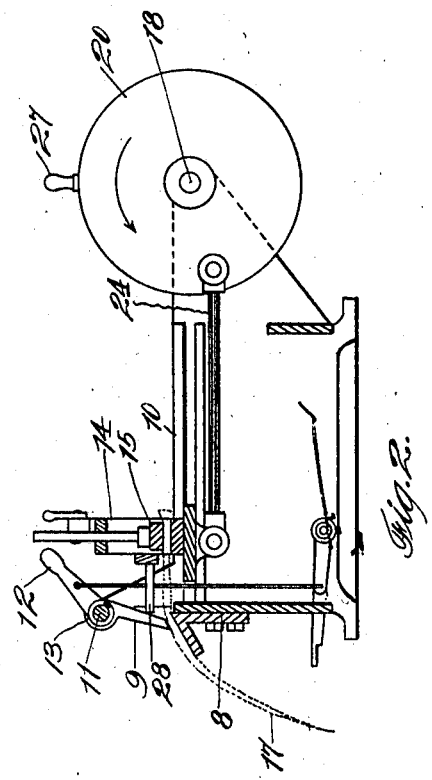
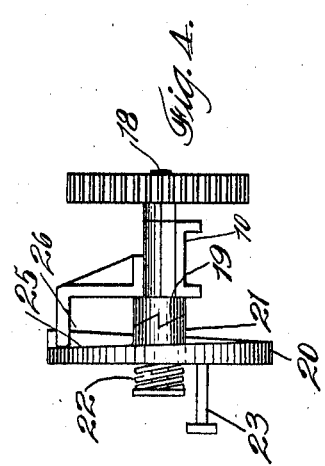
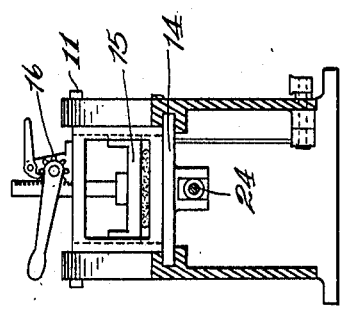
Inventor;
Michael G. McLane
By Geo. H. Strong.
his Atty
Witnesses:
F. E. Maynard
R. S. Burrys

UNITED STATES PATENT OFFICE.

MICHAEL G. McLANE, OF SAN FRANCISCO, CALIFORNIA.

FIBER-CLEANING DEVICE.

978,389.  Specification of Letters Patent.  Patented Dec. 13, 1910.

Original application filed April 21, 1909, Serial No. 491,334. Divided and this application filed September 23, 1909. Serial No. 519,164.

*To all whom it may concern:*

Be it known that I, MICHAEL G. McLANE, citizen of the United States, residing in the city and county of San Francisco and State of California, have invented new and useful Improvements in Fiber-Cleaning Devices, of which the following is a specification.

My invention relates to fiber-cleaning machines, and especially pertains to a mechanism for effecting the preliminary scutching of the stalks of hemp, ramie, and other fibrous plants.

The present application is a division of my application, fiber-cleaning machine, Serial No. 491,334.

The invention consists of the parts and the construction and combination of parts as hereinafter more fully described and claimed, having reference to the accompanying drawings, in which—

Figure 1 is a plan of the device. Fig. 2 is a vertical longitudinal section. Fig. 3 is a section on line X—X, Fig. 1. Fig. 4 is a detail of the clutch.

8 and 9 represent a pair of scrapers suitably mounted upon a table 10. The lower scraper 8 is stationary, while the upper scraper 9 is pivoted at 11 and is operated by a handle 12 to open it away from the scraper 8 against the tension of a spring 13, when it is desired to insert the end of a stalk or a bunch of stalks in between the scrapers.

A carrier 14 slides in suitable guides on frame 10 and has an adjustable clamp 15 operated by a rack and pinion 16, so that the clamp 15 may be pressed down on the bed of the carrier 14 to grip the stalk or bunch of stalks and pull the ends from out between the scrapers 8—9 when the carrier 14 is moved away from the scrapers. This movement of the fibrous stalks, represented at 17, past the closed scrapers 8—9 acts to strip off the wood and pulp and leave the fibrous cleaned ends of the stalks. A single movement of the carrier 14 and clamp bar 15 backward from the scrapers 8—9 is sufficient to clean the ends of the stalks.

Any appropriate means may be employed to give the carrier 14 one complete movement backward, and then forward into position ready for the next bunch of stuff. As here shown, the driving-shaft 18 of the machine has fixed to it a clutch collar 19, Figs. 1 and 4, and on this shaft is a loose disk 20 having a clutch collar 21 engageable and disengageable with the constantly rotating clutch collar 19. A spring 22 acts to press the clutch collars always toward each other. The disk 20 carries a wrist-pin 23 which projects far enough out beyond the end support for the spring 22 to allow for clearance of the pitman 24 which connects the wrist-pin with the carrier 14. The inside of the disk has a cam face 25 engageable with a fixed member 26; these surfaces coacting in the revolution of the disk to disengage the clutch collars 21—19. These clutch collars will be disengaged when the widest part of the circular cam 25 is resting against the fixed abutment 26, and the shaft 18 and clutch collar 19 will be free to revolve, while the disk and carrier 14 stand still. At this moment the carrier 14 is at its point of most forward position. When it is desired to start the carrier, the operator, by a pull on the handle 27, turns the disk so as to cause the wide part of the cam 25 to ride beyond the projection 26, whereupon the spring 22 operates to throw the clutches 21—19 into engagement, and the disk makes nearly one complete revolution, and the carrier 14 makes one complete reciprocation; whereupon the disk and carrier again stop.

Secured to and projecting forwardly from the carrier 14 is a push rod 28 adapted to abut against and release the scraper 9 from its binding engagement with the stalk 17, at each forward stroke of the carriage 14.

Having thus described my invention, what I claim and desire to secure by Letters Patent is—

1. In a fiber-cleansing device, a pair of coacting scrapers, a constantly-operating driver, a reciprocating clamp movable by said driver toward and from said scrapers, and means for disconnecting the clamp from the constantly-operating driver at the end of a single reciprocation of the clamp.

2. In a fiber-cleaning machine, a pair of scrapers, a reciprocating clamp, a constantly revolving shaft, and automatically operated clutch mechanism on the shaft, and means between the shaft and clamp for giving the clamp one complete reciprocation and then disconnecting it from said shaft during the revolution of the shaft.

3. In a fiber-cleaning machine, the combination with scraping devices, of a clamp member movable toward and from said devices, a rotary shaft, a driving clutch member fixed on the shaft, a loose driven clutch member normally in engagement with the first-named clutch member, said loose clutch member connected with the clamp to reciprocate the latter, and means including a cam member on said loose clutch member for disengaging the clutch members at the end of each revolution.

4. In a fiber-cleaning machine, the combination of scraping devices, a clamp movable toward and from said devices, a rotary shaft, a clutch member fixed on the shaft, a loose clutch member thereon, said last-named member secured to a disk, said disk having a wrist-pin, a pitman connecting said wrist-pin and said clamp, a spring for pressing the clutches together, and a cam face on said disk for automatically disengaging said clutches at the end of each revolution.

5. In a fiber-cleaning machine, the combination of scraping devices, a clamp movable toward and from said devices, a rotary shaft, a clutch member fixed on the shaft, a loose clutch member thereon, said last-named member secured to a disk, said disk having a wrist-pin, a pitman connecting said wrist-pin and said clamp, a spring for pressing the clutches together, a cam face on said disk for automatically disengaging said clutches at the end of each revolution, and a handle on the disk for turning the latter independent of the rotation of the shaft.

6. In a fiber-cleaning machine, the combination of a pair of co-acting scrapers, one of which is movable with relation to the other, means for normally holding the movable scraper toward the companion scraper, a reciprocating clamp movable toward and from said scraper, and a member carried by the clamp and adapted to engage the movable scraper to open it relatively to the companion scraper and to thereby release the stalk or bunch of stalks at each forward stroke of the clamp.

In testimony whereof I have hereunto set my hand in the presence of two subscribing witnesses.

MICHAEL G. McLANE.

Witnesses:
   CHARLES A. PENFIELD,
   CHARLES EDELMAN.